H. A. CONGER.
GEARING.
APPLICATION FILED DEC. 27, 1910.
1,045,517.
Patented Nov. 26, 1912.
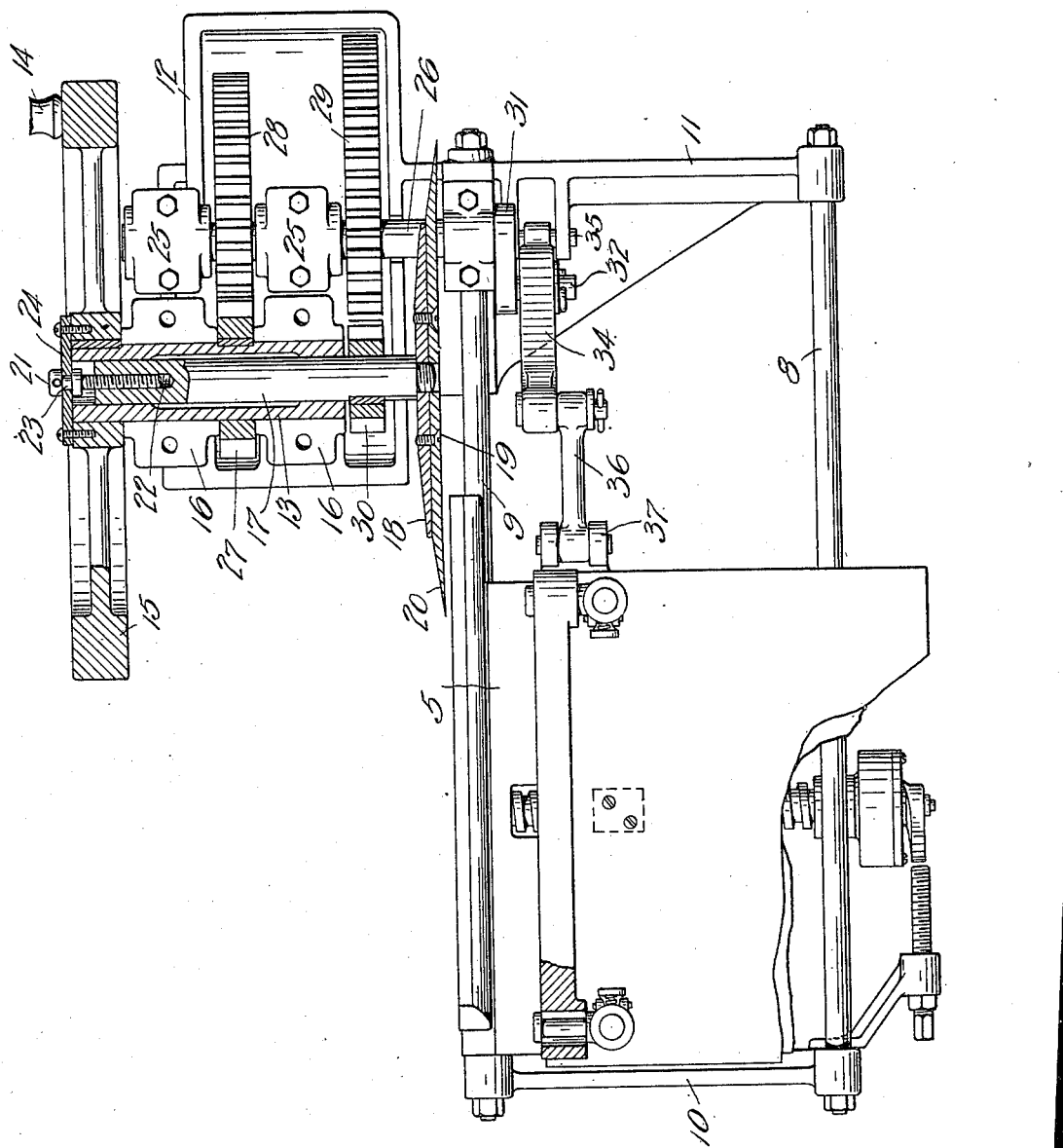
WITNESSES:
H. Barnes
E. Peterson
INVENTOR:
Herbert A. Conger
BY
Pierre Barnes
ATTORNEY

UNITED STATES PATENT OFFICE.

HERBERT A. CONGER, OF SEATTLE, WASHINGTON.

GEARING.

1,045,517.

Specification of Letters Patent. Patented Nov. 26, 1912.

Application filed December 27, 1910. Serial No. 599,607.

*To all whom it may concern:*

Be it known that I, HERBERT A. CONGER, a citizen of the United States, residing at Seattle, in the county of King and State of Washington, have invented certain new and useful Improvements in Gearing, of which the following is a specification.

This invention relates to gearing of a type particularly adapted for use in connection with slicing machines such as are utilized in cutting meat, and similar machines.

The object of my invention is the provision of a novel gearing having a driven shaft geared to the drive shaft carrying a cutter, and a driven shaft geared to the drive shaft and connected with a member to be reciprocated, the gearing elements between the shafts being so proportioned that the drive shaft will be driven at a considerably greater rate of speed than the driven shaft.

The invention consists in the novel construction and combination of parts, as will be hereinafter described and claimed.

The drawing shows a plan view of a slicing machine partly broken away, illustrating my improved gearing applied to the machine, certain of the elements being in section.

For the purpose of illustration, I have shown my improved gearing as applied to a meat slicing machine, the numeral 5 designating a carriage provided adjacent to its front and rear edges with depending apertured lugs 6 and 7 to respectively receive the transversely arranged rails 8 and 9. These rails are supported by end members 10 and 11 of the machine frame. Rigidly connected to or made integral with the frame member 11 is a gear-casing 12.

13 represents a tubular shaft, driven from any suitable source of power; but, as illustrated, is preferably arranged to be manually operated by a crank handle 14 carried by a fly-wheel 15 which is mounted on the shaft. Said shaft is journaled in boxes 16 supported by said gear-casing.

Extending into the shaft 13 is an arbor 17 provided at its forward protruding end with a collar 18 whereto is detachably connected, as by screws 19, a cutter wheel 20.

The shaft 13 is secured in any suitable manner against axial movement, while the arbor 17 is adapted for telescopic movement therewith for the purpose of regulating the position of said cutter-wheel relative to the plane of the rear-edge of the carriage 5. Such adjustment of the arbor is accomplished through the agency of a screw 21 engaging within a threaded hole 22 provided in the end of the arbor while the screw is prevented from endwise movement by the provision of a peripheral recess 23 on the screw interfitting with a collar 24 rigidly secured to the wheel 15. Journaled in boxes 25 of the frame is a second shaft 26 which is rotated by the shaft 13 through the medium of a toothed pinion 27 mounted on the latter engaging a gear wheel 28 provided on the driven shaft. The shaft 26, in turn, serves as a driver for the arbor 17 through the instrumentality of the gears 29 and 30. The above gearing elements are desirably proportioned so that the shaft 26 will be driven at a slower speed and the arbor 17 at a greater speed than that of the shaft 13.

At the forward end of shaft 26 is a crank arm 31 provided with a crank pin 32 which extends through the slot 33 of a vibratile bar 34. This bar is pivoted from near its lower end to a pin 35 secured to the machine frame below the shaft 26, and from its upper end the bar is connected by a link 36 with an arm 37 projecting from the aforesaid carriage. By such connection it will be evident that as the shaft 26 is rotated, the carriage 5 will be reciprocated on the rails 8 and 9.

The operation of the invention is as follows: When the shaft 13 is rotated, the shaft 26 and arbor 17 with which it is operatively connected by the gear-wheels 27—28 and 29—30 are driven to actuate the crank arm 31 and the cutter-wheel 20. The crank arm 31 through its connections with the carriage 5 imparts a reciprocatory motion to the carriage 5.

What I claim as my invention, is—

1. A machine of the class described comprising a hollow shaft, an arbor journaled in and projecting from said shaft, means for adjusting the arbor axially with respect to said shaft, a second shaft, a driving connection between the said shafts, and a driving connection between the second shaft and the projecting end of said arbor.

2. A machine comprising a hollow shaft, an arbor journaled in and projecting from the inner end of said shaft, means carried by the outer end of the shaft and engaging in said arbor for adjusting the same axially with respect to said shaft, a second shaft, a pinion carried by and rotating with said first shaft, a second shaft, a gear carried by said
5 shaft and meshing with said pinion, a gear carried by said second shaft and of greater diameter than the first mentioned gear, and a pinion fixed to the projecting end of said arbor and meshing with said larger gear.

HERBERT A. CONGER.

Witnesses:
H. BARNES,
E. PETERSON.